(12) United States Patent
Akiyoshi

(10) Patent No.: US 9,984,036 B2
(45) Date of Patent: May 29, 2018

(54) COMMUNICATION SYSTEM, CONTROL APPARATUS, COMMUNICATION METHOD, AND PROGRAM

(71) Applicant: NEC Corporation, Tokyo (JP)

(72) Inventor: Ippei Akiyoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 470 days.

(21) Appl. No.: 14/770,419

(22) PCT Filed: Feb. 25, 2014

(86) PCT No.: PCT/JP2014/054473
§ 371 (c)(1),
(2) Date: Aug. 25, 2015

(87) PCT Pub. No.: WO2014/132954
PCT Pub. Date: Sep. 4, 2014

(65) Prior Publication Data
US 2016/0012008 A1    Jan. 14, 2016

(30) Foreign Application Priority Data

Feb. 26, 2013 (JP) ................................. 2013-036089

(51) Int. Cl.
*G06F 15/167* (2006.01)
*H04L 12/713* (2013.01)
(Continued)

(52) U.S. Cl.
CPC .......... *G06F 15/167* (2013.01); *H04L 45/586* (2013.01); *H04L 49/30* (2013.01);
(Continued)

(58) Field of Classification Search
CPC ..... G06F 15/167; H04L 49/70; H04L 49/354; H04L 67/1097; H04L 49/30; H04L 45/586; H04L 45/74
See application file for complete search history.

(56) References Cited

U.S. PATENT DOCUMENTS 6,691,165 B1 * 2/2004 Bruck ............... H04L 29/12009
709/227
7,075,910 B2 * 7/2006 Chen ................. H04L 29/12018
370/331

(Continued)

FOREIGN PATENT DOCUMENTS

JP     2011-081588 A    4/2011
WO    WO 2008/095010 A1    8/2008

OTHER PUBLICATIONS

International Search Report (ISR) (PCT Form PCT/ISA/210), in PCT/JP2014/054473, dated Apr. 22, 2014.

(Continued)

*Primary Examiner* — Kevin T Bates
*Assistant Examiner* — Ronak Patel
(74) *Attorney, Agent, or Firm* — McGinn IP Law Group, PLLC

(57) ABSTRACT

When a communication apparatus receives a packet in accordance with a predetermined protocol through a second connection IF different from a first connection IF to which a packet having a same address as an address included in the packet in accordance with the predetermined preset protocol has so far been connected, a management unit receives a notification from the communication apparatus, and checks, with reference to a storage storing information on one or more connection Ifs supporting address floating, whether or not the first connection IF and the second connection IF of the communication apparatus belong to a common connec- (Continued)

tion IF group that supports address floating to determine presence or absence of the address floating.

20 Claims, 9 Drawing Sheets

(51) Int. Cl.
*H04L 12/935* (2013.01)
*H04L 12/931* (2013.01)
*H04L 29/08* (2006.01)
*H04L 12/741* (2013.01)

(52) U.S. Cl.
CPC ............ *H04L 49/354* (2013.01); *H04L 49/70* (2013.01); *H04L 67/1097* (2013.01); *H04L 45/74* (2013.01)

(56) References Cited

U.S. PATENT DOCUMENTS

| | | | |
|---|---|---|---|
| 7,840,655 B2* | 11/2010 | Murray | H04L 61/103 709/200 |
| 8,108,514 B2* | 1/2012 | Coffey | H04L 29/12264 709/224 |
| 9,154,367 B1* | 10/2015 | Kontothanassis | H04L 67/1034 |
| 2001/0017857 A1* | 8/2001 | Matsukawa | H04L 29/12018 370/392 |
| 2005/0207429 A1* | 9/2005 | Akita | H04W 4/16 370/401 |
| 2007/0244999 A1* | 10/2007 | Hamanaka | G06F 8/65 709/220 |
| 2008/0189769 A1 | 8/2008 | Casado et al. | |
| 2009/0172151 A1* | 7/2009 | Davis | H04L 29/12264 709/224 |
| 2010/0027551 A1* | 2/2010 | Arkin | H04L 29/12028 370/400 |
| 2010/0162036 A1* | 6/2010 | Linden | G06F 11/181 714/4.11 |
| 2010/0214979 A1* | 8/2010 | Kuehnel | H04L 41/00 370/328 |
| 2010/0322255 A1 | 12/2010 | Hao et al. | |
| 2011/0058482 A1* | 3/2011 | Nomura | H04L 29/12264 370/241 |
| 2012/0195187 A1 | 8/2012 | Ashihara et al. | |
| 2013/0070776 A1* | 3/2013 | Sato | H04L 45/586 370/401 |
| 2013/0136126 A1* | 5/2013 | Wang | H04L 61/103 370/392 |
| 2013/0205011 A1* | 8/2013 | Toumura | H04L 67/1031 709/224 |

OTHER PUBLICATIONS

Nick McKeown and seven other authors, "OpenFlow: Enabling Innovation in Campus Networks," [online], [Searched on Oct. 31, Heisei 24], Internet <URL: http://www.openflowswitch.org//documents/openflow-wp-latest.pdf>.

"OpenFlow Switch Specification" Version 1.1.0 Implemented (Wire Protocol 0x02), [Searched on Oct. 31, Heisei 24], Internet <URL: http://www.openflowswitch.org/documents/openflow-spec-v1.1.0.pdf>.

Hanqian Wu, "Network Security for Virtual Machine in Cloud Computing," Computer Sciences and Convergence Information Technology (ICCIT), 2010 5th International Conference on, IEEE, Dec. 2, 2010, pp. 18 to 21.

* cited by examiner

FIG. 3A

| PORT GROUP ID | PACKET FORWARDING FUNCTION | PORT NUMBER |
|---|---|---|
| 1 | PACKET FORWARDING FUNCTION 23 | 1 |
| | PACKET FORWARDING FUNCTION 23 | 2 |
| | : | : |
| : | : | : |

FIG. 3B

| IP ADDRESS | MAC ADDRESS |
|---|---|
| IP#A | MAC#A |
| IP#B | MAC#B |
| : | : |
| : | : |

COMMUNICATION SYSTEM, CONTROL APPARATUS, COMMUNICATION METHOD, AND PROGRAM

CROSS-REFERENCE TO RELATED APPLICATIONS

The present invention is based upon and claims the benefit of the priority of Japanese Patent Application No. 2013-036089 (filed on Feb. 26, 2013), the disclosure of which is incorporated herein in its entirety by reference.

TECHNICAL FIELD

The present invention relates to a communication system, a control apparatus, a communication method, and a program.

BACKGROUND

In recent years, a network architecture of a centralized control type is proposed. As an example of the network architecture of the centralized control type, there is provided a technology called OpenFlow (refer to Patent Literature 1 and Non Patent Literatures 1 and 2).

<OpenFlow (OpenFlow)>

OpenFlow treats communication as end-to-end flow, and performs path control, malfunction recovery, load balancing, and optimization on a per flow basis. An OpenFlow switch (OpenFlow Switch: abbreviated as "OFS") is specified in Non Patent Literature 2, for example. OpenFlow switch communicates with an OpenFlow controller (OpenFlow Controller: abbreviated as "OFC") corresponding to a control apparatus, using a secure channel, for example. The OFS includes a flow table in which appropriate adding or rewriting is instructed by the OFC, and operates according to content of the flow table.

<OFS and Flow Table>

FIG. 6 is a diagram schematically illustrating a flow entry 120 of a flow table. In the flow table, a set of a matching rule (match field: Match Field) (header field) to be matched against a header of a packet received by the OFS, flow statistical information (Counters), actions (Actions) defining processing content is defined for each flow (refer to FIG. 6).

On reception of a packet, the OFS searches the flow table for an entry having a matching rule that matches header information of the received packet. When the entry that matches the received packet is found as a result of the search of the flow table, the OFS updates the flow statistical information (one or more Counters), and executes, for the received packet, processing content (e.g., transmission of the packet from a specified port, flooding of the packet, discarding of the packet, or the like) described in the field of actions (Actions) of the entry.

<Packet-In>

On the other hand, when the entry that matches the received packet is not found in the OFS as the result of the search, the OFS forwards the received packet (as a Packet In message) to the OFC through a secure channel and requests determination of a path for the packet based on information on a transmission source and a transmission destination of the received packet. The OFC calculates a path based on network topology information, generates a flow entry (in FIG. 6), and transmits a message for updating a flow table to each OFS on the calculated path. The OFS receives, from the OFC, information on the flow entry corresponding to the path for the packet determined by the OFC and updates a flow table. In this way, the OFS processes the received packet by using the information on the flow entry stored in the flow table as a processing rule.

[PTL 1]
International Publication No. WO2008/095010
[NPL 1]
Nick McKeown and seven other authors, "OpenFlow: Enabling Innovation in Campus Networks," [online], [Searched on October 31, Heisei 24], Internet <URL: http://www.openflowswitch.org//documents/openflow-wp-latest.pdf>.
[NPL 2]
"OpenFlow Switch Specification" Version 1.1.0 Implemented (Wire Protocol 0x02), [Searched on October 31, Heisei 24], Internet <URL: http://www.openflowswitch.org/documents/openflow-spec-v1.1.0. pdf>.

SUMMARY

Analyses of the related arts will be given below.

A problem associated with the related arts will be described, with reference to FIGS. 7 and 8. FIG. 7 is a diagram of a system configuration for explaining as problem associated with the related arts, and illustrates an example of a communication system (of a prototype to which the present invention is not applied). FIG. 8 is a diagram illustrating an operation sequence of the system in FIG. 7. Referring to FIG. 7, this communication system (of the prototype) includes an OFC 110, OFSs 121 to 123, a communication terminal 130, and servers 141 to 143. The servers 141 and 142 have an Active (active)/Standby (standby) redundant configuration (in which at least one server is set to a standby system (standby system) and the other is set to an active system). It is assumed herein that the server 141 is in an Active state (active state: active system), and the server 142 is in a Standby state (standby state: standby system)

<Address Floating>

The server 141 and the server 142 have a sharable IP (Internet Protocol) address (referred to as a "floating IP address"). A floating IP address is an IP address to be used by a server in the Active (active) state. When the states of the servers are exchanged (so that the server in the Standby (standby) state is switched to the Active state and the server in the Active state is switched to the Standby state), the server that has newly transitioned to the Active state takes over the floating IP address to continue communication. Taking-over of the address is referred to as "address floating". It is assumed in FIG. 7 that an IP address that is the same as the floating IP address is set in the server 143 due to a setting error or the like, for example.

<Server Switching>

The following describes, with reference to FIG. 8, path control processing when the communication terminal 130 in FIG. 7 performs communication and path control processing when Active/Standby state switching processing is performed between the server 141 and the server 142. Then, a description will be directed to a situation where a communication state is confused by intervention of the server 143. First, the description will be given about the path control processing when the communication terminal 130 performs the communication. In the following description, a number in brackets appended to the end of a sentence that explains each processing corresponds to the number of a representative sequence schematically illustrated in FIG. 8.

The communication terminal 130 transmits a data packet in order to start access to the server 141 (1). The OFS 121 receives the data packet from the communication terminal 130. A flow of the data packet is not set (a flow entry corresponding to the packet is not set in the flow table of the OFS 121), and is a new flow. For this reason, the OFS 121 transmits a packet-in (Packet-In) message to the OFC 110 (2), and requests setting of a path for the received data packet. The OFC 110 that has received the packet-in message from the OFS 121 calculates a path from the communication terminal 130 to the server 141 when the OFC 110 determines that communication is possible. The OFC 110 transmits a flow modify (Flow Modify: abbreviated as "FlowMod") message to the OFS 121 (3-1). Herein, the FlowMod message is one of an OpenFlow protocol message, and is a message from the OFC for causing the OFS to register the flow entry or change a flow entry in the flow table. The OFC 110 transmits a FlowMod message to each of the OFSs 122 and 123 on the communication path (3-2 and 3-3), thereby setting a flow entry for implementing the communication between the communication terminal 130 and the server 141 in the flow table of each of the OFSs 122 and 123. The OFC 110 transmits a packet-out (Packet-Out) message to the OFS 121 (4) to instruct the OFS 121 to forward the data packet. The OFS 121 that has received the packet-out (Packet-Out) message from the OFC 110 outputs the data packet received in sequence 1 from a port specified (in the flow entry set by the FlowMod message that has been transmitted (3-1)) in the flow table, thereby forwarding the packet to the OFS 122 (5). The OFS 122 forwards the data packet (data packet forwarded from the OFS 121) to the OFS 123 from a port specified in the flow entry set by the FlowMode message transmitted (3-2) from the OFC 110. The OFS 123 forwards the data packet (data packet forwarded from the OFS 122) to the server 141 from a port specified in the flow entry set in the FlowMode massage transmitted (3-3) from the OFC 110.

When a path for communication between the communication terminal 130 and the server 141 is set, the communication terminal 130 starts communication (transmission and reception of a data packet) with the server 141 (6).

<Path Control Processing at Time of Server Switching>

Next, with reference to FIGS. 7 and 8, the description will be directed to the path control processing when the Active/Standby state switching processing between the server 141 and the server 142 is performed.

It is assumed that IP address floating has occurred when Active/Standby state switching is performed between the server 141 and the server 142, or when the server 142 in the Standby state transitions to the Active state. The server 142 broadcasts a Gratuitous Address Resolution Protocol (abbreviated as "GARP") packet associated with a floating IP address (7), thereby notifying a change of a MAC (Media Access Control) address associated with a floating IP address to the communication system.

A GARP packet is an ARP (Address Resolution Protocol) packet in which an IP address of a transmission source and an IP address of a destination for which a request has been made are the same. A GARP packet is used for detecting IP address duplication due to setting error or the like, for example. An ARP packet is used for resolving a MAC address (destination MAC address) corresponding to an IP address of a destination. The request of ARP is broadcast from a transmission source. When an IP address of the destination set in the ARP request is equal to an IP address of a node (host or terminal) that has received the ARP request, the node sets a MAC address of the node in a response (ARP reply) for the ARP request, and transmits in unicast the MAC address to the transmission source. When IP address duplication is present in a network to which the GARP packet has been transmitted, a reply packet for the GARP packet including the MAC address of the node is returned to the transmission source of the GARP packet from a node having the same IP address as the IP address of the transmission source. The transmission source of the GARP packet detects that an IP address of the node that has transmitted the reply packet duplicates the IP address of the transmission source of the GARP packet.

In the OFS 123 that has received the GARP packet, a flow associated with the GARP packet is not set. The flow is therefore a new flow. For this reason, the OFS 123 transmits a packet-in (Packet-In) message to the OFC 110 (8).

When the OFC 110 receives the GARP packet through the Packet-In message from the OFS 123, the OFC 110 checks a path setting state of the communication using the floating IP address associated with the GARP packet, and detects address floating (taking-over of the address to the server 142) (9). The OFC 110 transmits a FlowMod message to each of the OFSs 121, 122, and 123 (10-1, 10-2, and 10-3) so that the path terminated so far at the server 141 is terminated at the server 142 to allow the communication to be continuously performed, thereby performing path switching.

<Path Control Processing Caused by Intervention of Another Server>

Further, with reference to FIGS. 7 and 8, the description will be given about a flow until a communication state falls into confusion, due to intervention of the server 143.

When the server 143 is connected to the communication system, the server 143 broadcasts a GARP packet associated with the IP address set in the server 143 itself in order to perform communication using the IP address (12). This IP address (IP address set in the server 143) is the same as a floating IP address used by the server 142. The OFS 123 receives the GARP packet from the server 143 from a port different from a port used for connection with the server 142. The OFS 123, on reception of the GARP packet, searches the flow table held in the OFS 123. Since an entry (flow entry) that matches the received GARP packet is not found as a result of the search (since a flow corresponding to the GARP packet is a new flow), the OFS 123 transmits a Packet-In message to the OFC 110 through a secure channel (13).

The OFC 110 that has received the GARP packet through the Packet-In message from the OFS 123 detects address floating (taking-over of the address to the server 143) (14). The OFC 110 transmits a FlowMod message to each of the OFSs 121, 122, and 123 (15-1, 15-2, and 15-3) and performs path switching so that a path terminated so far at the server 142 is terminated at the server 143. As a result, the communication between the communication terminal 130 and the server 142 in the Active state immediately before the path switching is disconnected.

In the above description, an IPv4 (Internet Protocol Version 4) address (IP address=32 bits) is assumed and the GARP is taken as an example as a trigger for communication switching associated with address floating. A different trigger, however, may be used. As the different trigger, when an IPv6 (Internet Protocol Version 6) (IP address=128 bits) is assumed, a neighbor advertisement message (Neighbor Advertisement) message or the like is provided. A neighbor advertisement (Neighbor Advertisement) is a response (ICMPV6 Type=136) to a neighbor solicitation (Neighbor Solicitation) message of ICMPv6 (Internet Control Message Protocol for IPv6) (ICMPV6 Type=135).

As described using the prototype in FIGS. 7 and 8, as an example, when the OFC detects, through a Packet-In message from the OFS (e.g., in sequence 13 in FIG. 8), that a GARP packet for detecting IP address duplication has been received by the OFS from a port different from a port so far used for forwarding a packet including an IP address of a destination or a transmission source, which is the same as an IP address associated with a GARP packet, for example, in the network architecture of the centralized control type as OpenFlow (e.g., in sequence 12 in FIG. 8), the OFC cannot appropriately determine whether or not path switching should be performed, by using reception of the GARP packet, as a trigger.

That is, when a server having address duplication due to setting error or the like is mixed in the example of the above-mentioned prototype in FIGS. 7 and 8, erroneous determination of the address floating occurs (e.g., in sequence 14 in FIG. 8). As a result, path switching or the like is performed to the server (143 in FIGS. 7 and 8, for example) whose IP address has duplicated due to setting error or the like (in sequences 15-1 to 15-3, and 16, for example), so that the communication with the server (142 in FIGS. 7 and 8, for example) to be originally performed is disconnected. Then, means for reliably avoiding occurrence of such a situation has not been proposed.

Accordingly, the present invention has been contrived in view of the above-mentioned problem. An object of the present invention is to provide a communication system, a control apparatus, a communication method, and a program capable of avoiding erroneous determination of address floating, for reception of a packet in accordance with a predetermined protocol such as a GARP or a packet equivalent to the GARP, for example.

According to one of some aspects (aspect 1) of the present invention, there is provided a communication system comprising:

a control apparatus configured to generate a processing rule that defines packet processing in a communication apparatus and set the generated processing rule in the communication apparatus; and the communication apparatus configured to process a received packet according to the processing rule set by the control apparatus, wherein the control apparatus includes:

a storage unit configured to store a connection IF (interface) group information including information on one or more connection IFs of the communication apparatus capable of supporting address floating; and a management unit configured to receive a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol, and check, with reference with the storage unit, whether or not the first connection IF and the second connection IF of the communication apparatus belong to a common connection IF group that supports address floating to determine presence or absence of the address floating.

According to another one of the aspects (aspect 2), there is provided a control apparatus comprising:

a first unit configured to generate a processing rule that defines packet processing and set the generated processing rule in a communication apparatus configured to process a received packet according to the processing rule;

a storage unit configured to store a connection IF (interface) group information including information on one or more connection IFs of the communication apparatus capable of supporting address floating; and a second unit configured to receive a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol, and check, with reference with the storage unit, whether or not the first connection IF and the second connection IF of the communication apparatus belong to a common connection IF group that supports address floating to determine presence or absence of the address floating.

According to further another one of the aspects (aspect 3), there is provided a method by a control apparatus configured to generate a processing rule that defines packet processing in a communication apparatus and set the generated processing rule in the communication apparatus, and the method includes the following:

storing in a storage unit a connection IF (interface) group information including information on one or more connection IFs of the communication apparatus capable of supporting address floating;

receiving a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol; and checking, with reference to the storage unit, whether or not the first connection IF and the second connection IF of the communication apparatus belong to a common connection IF group that supports address floating to determine presence or absence of the address floating.

According to yet another one of the aspects (aspect 4), there is provided a program for a computer constituting a control apparatus configured to generate a processing rule that defines packet processing in a communication apparatus and set the generated processing rule in the communication apparatus, the program causing the computer to execute processings of:

managing a storage unit configured to store a connection IF (interface) group information including information on one or more connection IFs of the communication apparatus capable of supporting address floating;

receiving a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol; and checking, with reference to the storage unit, whether or not the first connection IF and the second connection IF of the communication apparatus belong to a common connection IF group that supports address floating to determine presence or absence of the address floating.

According to still another one of the aspects (aspect 5), there is provided a non-transitory computer readable recording medium (such as a semiconductor memory, a magnetic/optical disk, or the like) storing the program.

According to the present invention, it is made possible to avoid erroneous determination, when determination of address floating is made in response to reception of the packet in accordance with a predetermined preset protocol. Consequently, erroneous path switching to be caused by the erroneous determination of the address floating can be avoided.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

FIGS. 3A and 3B are tables explaining examples of information tables managed by a port group management unit 18A according to the first exemplary embodiment, in which FIG. 3A is an information table for port group management, and FIG. 3B is an information table for managing correspondence relationships between IP addresses and MAC addresses.

DETAILED DESCRIPTION OF DISCLOSURE

Figure 9:
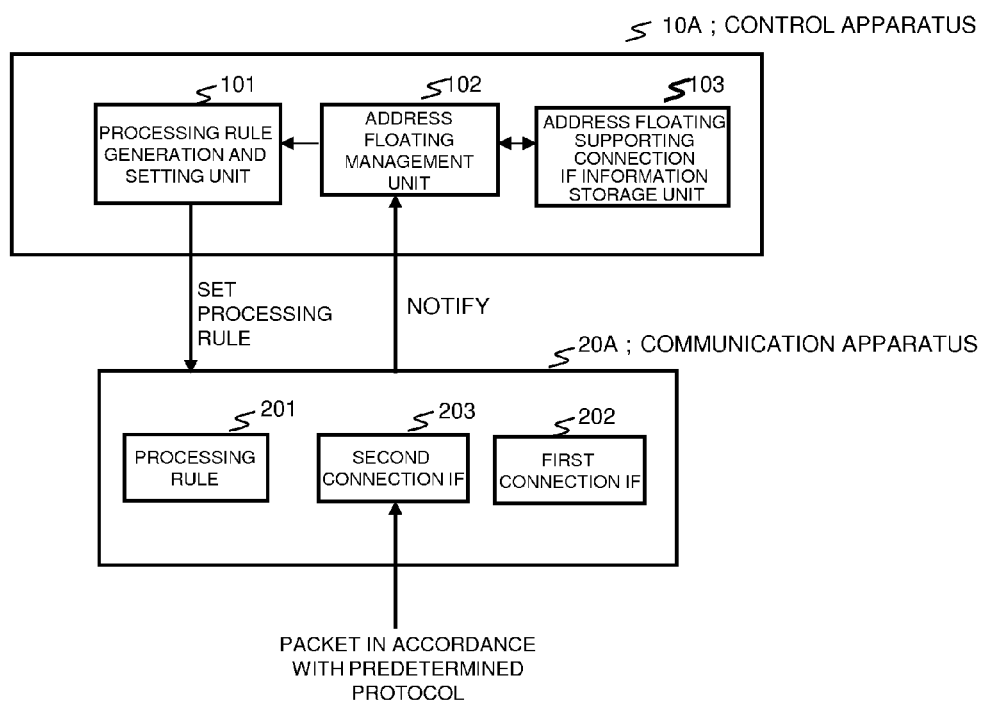
FIG. 9 is a diagram illustrating a basic configuration of an exemplary embodiment of the present invention.

The following describes exemplary embodiments of the present invention. Referring to FIG. 9, a communication system according to an aspect of preferred modes and exemplary embodiments of the present invention, includes a control apparatus (10A) configured to generate a processing rule (201) that defines packet processing in a communication apparatus (20A) and sets the processing rule (201) in the communication apparatus (20A), and the communication apparatus (20A) configured to process a received packet according to the processing rule (201) set by the control apparatus (10A), upon reception of the packet. The control apparatus (10A) includes a first unit (processing rule generation and setting unit 101) configured to generate the processing rule and set the generated processing rule in the communication apparatus (20A), a storage unit (address floating supporting connection IF information storage unit 103) configured to store a connection IF (connection interface) group including information on one or more connection IFs of the communication apparatus capable of supporting address floating, and a second unit (address floating checking unit 102). When a packet in accordance with a predetermined preset protocol is received at the communication apparatus (20A) through a second connection IF (203) different from a first connection IF (202) that has been so far used (connected) for forwarding a packet having a same address as an address associated with the packet in accordance with the predetermined preset protocol, the second unit receives a notification from the communication apparatus (20A), and refers to the storage unit (103) to check whether or not the first connection IF (202) and the second connection IF (203) of the communication apparatus belong to a common connection IF group that supports address floating to determine presence or absence of the address floating. When the communication apparatus is connected to a respective plurality of node apparatuses (such as servers or the like having a redundant configuration configured to take over the address when switching from a standby system to an active system is performed or the like, for example) capable of supporting the address floating through a plurality of connection IFs, for example, these connection IFs of the communication apparatus are stored and managed by the storage unit (address floating supporting connection IF information storage unit 103) of the control apparatus (10A) as belonging to the common connection IF group that correspond to floating of the address.

The connection IF group that corresponds to floating of the address and is stored and held in the storage unit (103) in the control apparatus (10A) includes a port group which includes information on one or more ports of the communication apparatus and supports address floating.

Referring to FIG. 9, according to an aspect of some preferred modes and exemplary embodiments of the present invention, when a packet in accordance with the predetermined preset protocol is received at the communication apparatus (20A) through a second connection IF (such as a second port) (203) different from a first connection IF (such as a first port) (202) that has been so far used for forwarding a packet having the same address as the address associated with a packet in accordance with the predetermined preset protocol, the second unit (address floating checking unit 102) of the control apparatus (10A) receives the notification from the communication apparatus (20A), and refers to the storage unit (103) to check whether or not the first connection IF (such as the first port) and the second connection IF (such as the second port) belong to a common connection IF group (common port group). When the first connection IF and the second connection IF are determined to belong to the common connection IF group, the second unit (address floating checking unit 102) determines that address floating has occurred (a destination node for the second connection IF is a node where the address of a destination node for the first connection IF is to be taken over). When the first connection IF and the second connection IF are determined not to belong to a common connection IF group, the second unit determines that the address floating has not occurred (the destination node for the second connection IF is not the node where the address of the destination node for the first connection IF is to be taken over). When the second unit (102) determines that the address floating has occurred, the first unit (101) sets, in the communication apparatus (20A), the processing rule (201) for switching the connection IF at the communication apparatus (20A) from the first connection IF (202) to the second connection IF (203). Though no particular limitation is imposed, processing of the first and second units may naturally be implemented by a program that runs on a computer (data processing apparatus, processor, or CPU (Central Processing Unit)) that constitutes the control apparatus.

According to an aspect of preferred modes and exemplary embodiments of the present invention, the connection IF group that correspond to floating of the address may be configured to include a port group which includes information on the one or more ports of the communication apparatus and supports the address floating or a set of the port group and VLAN (Virtual Local Area Network) information.

According to an aspect of preferred modes and exemplary embodiments of the present invention, the address for floating may be an IP (Internet Protocol) address, or a MAC (Media Access Control) address.

Though no particular limitation is imposed, a packet in accordance with the predetermined preset protocol may be a packet (GARP) transmitted for detecting address duplication using an address resolution packet. Alternatively, a packet in accordance with the predetermined preset protocol may be a neighbor advertisement (NA: Neighbor Advertisement) packet, or a packet equivalent to the packet (GARP) or the neighbor advertisement packet.

Though no particular limitation is imposed, information in the storage unit (103) configured to store the connection IF group that includes information on the one or more connection IFs of the communication apparatus and supports the address floating, may be dynamically and variably set and controlled, according to an increase or a decrease of the communication apparatus (node apparatus including a packet forwarding function) or an increase or a decrease of the connection IF (port) of the communication apparatus (node apparatus). In some modes of the present invention, a function of the communication apparatus (20A) may be implemented in an OFS, and a function of the control apparatus (10A) may be implemented in an OFC. According to some preferred modes of the present invention, presence or absence of the address floating can be correctly determined, in response to reception of the packet in accordance with the predetermined preset protocol. Occurrence of erroneous path switching to be caused by erroneous determination of the address floating, for example, can be thereby avoided.

First Exemplary Embodiment

<System Configuration>

Figure 1:
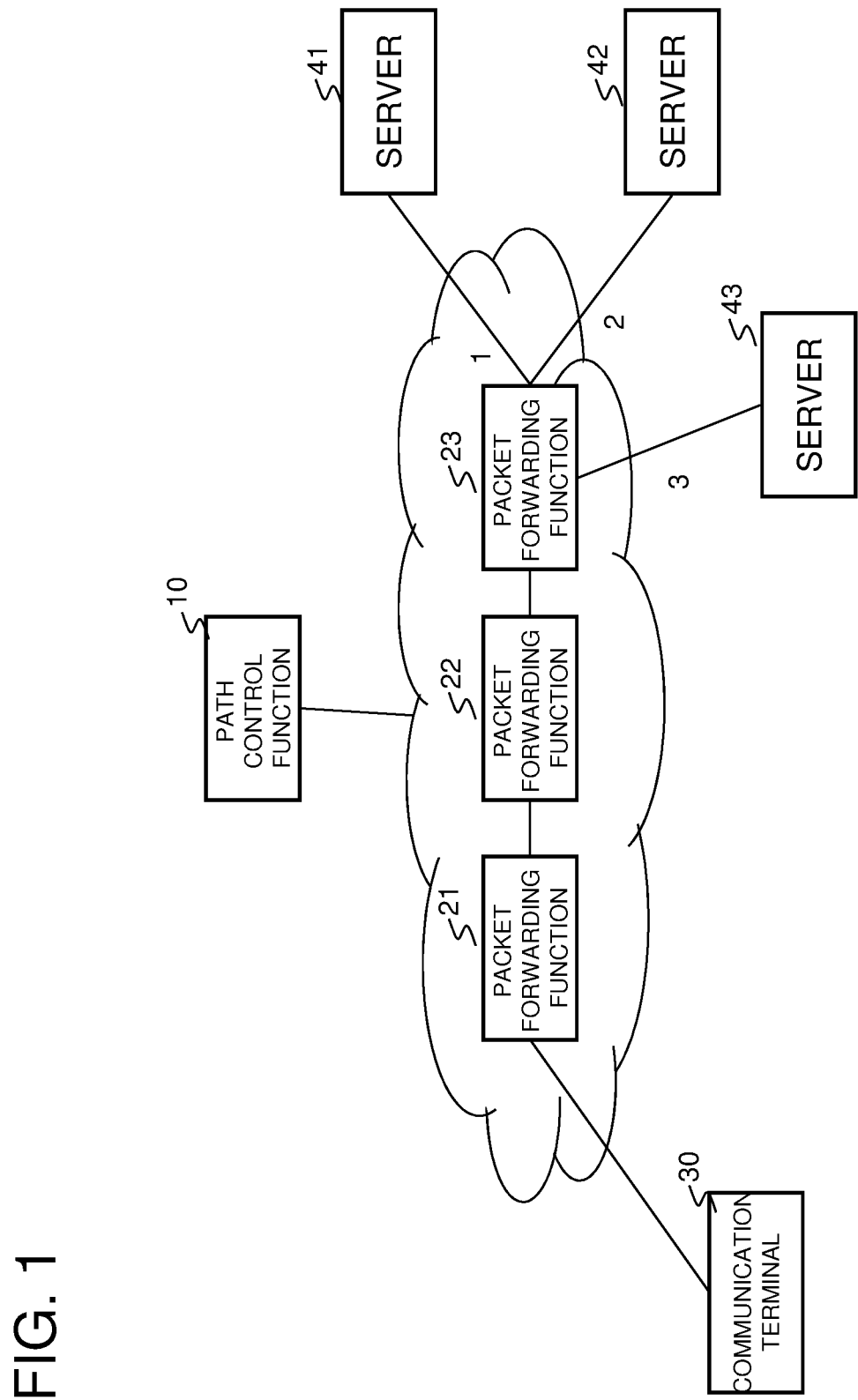
FIG. 1 is a diagram illustrating a configuration example of a communication system according to a first exemplary embodiment.

Referring to FIG. 1, a communication system in an exemplary embodiment of the present invention includes a plurality of packet forwarding functions 21 to 23, each configured to process a received packet according to a packet forwarding rule that associates a matching rule for identifying a flow and processing content to be applied to the matching rule, and a path control function 10 configured to set the packet forwarding rule in each of the packet forwarding functions. A communication terminal 30 and server functions 41 to 43 are connected to this communication system. Referring to FIG. 1, numerals (1, 2, 3) described beside solid lines indicating connections of the respective server functions and the packet forwarding function 23 indicate port numbers of the packet forwarding function 23 to which the respective server functions are connected. A floating address in this exemplary embodiment is assumed to be an IP address. The packet forwarding functions 21 to 23 may be configured to be respectively implemented in node apparatuses (communication apparatuses) that are network-connected. The path control function 10 may be configured to be implemented in a control apparatus configured to control the node apparatuses (communication apparatuses).

<Path Control Function>

Figure 2:
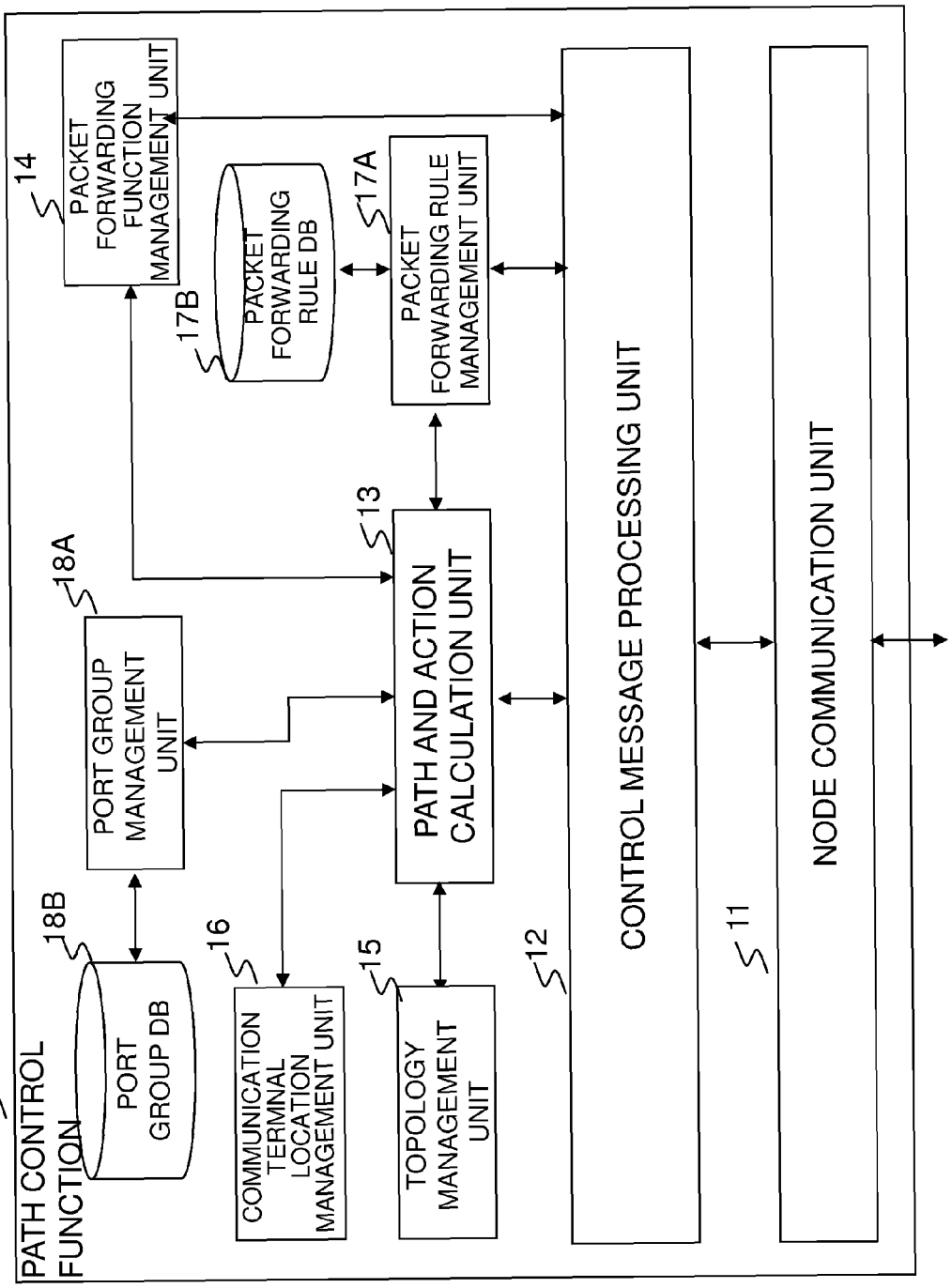
FIG. 2 is a diagram illustrating a configuration example of a path control function according to the first exemplary embodiment.

FIG. 2 is a diagram illustrating a detailed configuration of the path control function 10 in FIG. 1. Referring to FIG. 2, the path control function 10 includes a node communication unit 11 configured to communicate with each of the packet forwarding functions 21 to 23, a control message processing unit 12, a path and action calculation unit 13, a packet forwarding function management unit 14, a topology management unit 15, a communication terminal location management unit 16, a packet forwarding rule management unit 17A, and a port group management unit 18A. Each of these units operates as follows.

The control message processing unit 12 analyzes a control message received from each of the packet forwarding functions 21 to 23 and delivers information on the control message to relevant processing means in the path control function 10.

The path and action calculation unit 13 finds an action to be executed by each packet forwarding function on a forwarding path for the packet, based on location information of the communication terminal managed by the communication terminal location management unit 16 and topology information constructed by the topology management unit 15. When the path and action calculation unit 13 detects possibility of occurrence of address floating with reception of a GARP packet, for example, the path and action calculation unit 13 cooperates with the port group management unit 18A to determine whether or not the address floating has actually occurred. When the address floating has occurred and the packet forwarding rule associated with the address that has floated is configured, the packet forwarding rule is updated so that communication is continued, even at a destination of the address floating. As described before, the address floating may be of course determined in response to reception of a neighbor advertisement packet.

The packet forwarding function management unit 14 manages capability (such as the number and types of ports and the type of an action to be supported) of each packet forwarding function controlled by the path control function 10.

The topology management unit 15 constructs the topology information of a network based on a connection relationship of the packet forwarding functions collected through the node communication unit 11.

The communication terminal location management unit 16 manages information for identifying a location of the communication terminal connected to the communication system. In this exemplary embodiment, in the communication terminal location management unit 16, it is assumed that
  as information for identifying a point of connection of the
    communication terminal to the communication system,
    a MAC address of the communication terminal is used,
    and
  information for identifying a location of the communication terminal, information for identifying each of the
    packet forwarding functions (21 to 23 in FIG. 1) to
    which the communication terminal is connected and
    information of each port of the packet forwarding
    functions are used. Other information may be, as a
    matter of course, used.

The packet forwarding rule management unit 17A performs management regarding what packet forwarding rule is set in which packet forwarding function. Specifically, the packet forwarding rule management unit 17A registers a result of calculation by the path and action calculation unit 13 in a packet forwarding rule database (DB) 17B as a packet forwarding rule, and sets the packet forwarding rule in each of the packet forwarding functions (21, 22, 23 in FIG. 1). Further, the packet forwarding rule management unit 17A updates information registered in the packet forwarding rule database (DB) 17B so as to cope with a case where a change has occurred in the packet forwarding rule set in advance in each of the packet forwarding functions (21, 22, 23, and so on in FIG. 1), by notification of deletion of a packet forwarding rule from one of the packet forwarding functions (21, 22, 23, and so on in FIG. 1) or the like.

The port group management unit 18A stores and manages information on a range that allows address floating, using a port group database (DB) 18B. FIGS. 3A and 3B are diagrams schematically illustrating the information stored in the port group database (DB) 18B. The following describes information in the port group database (DB) 18B managed by the port group management unit 18A with reference to FIGS. 3A and 3B.

<Example of Information in Port Set DB>

FIG. 3A illustrates an information table indicating the range (communication apparatuses that support the address floating and numbers for ports of the communication apparatuses that support the address floating) that allows the address floating. Correspondences of one or more sets of the packet forwarding functions and port numbers are stored, in association with a port group ID. It is found from FIG. 3 that the ports of port numbers 1 and 2 of the packet forwarding function 23 to which the server function 41 and the server function 42 are respectively connected belong to a same port group (with the port group ID of 1).

Figure 7:
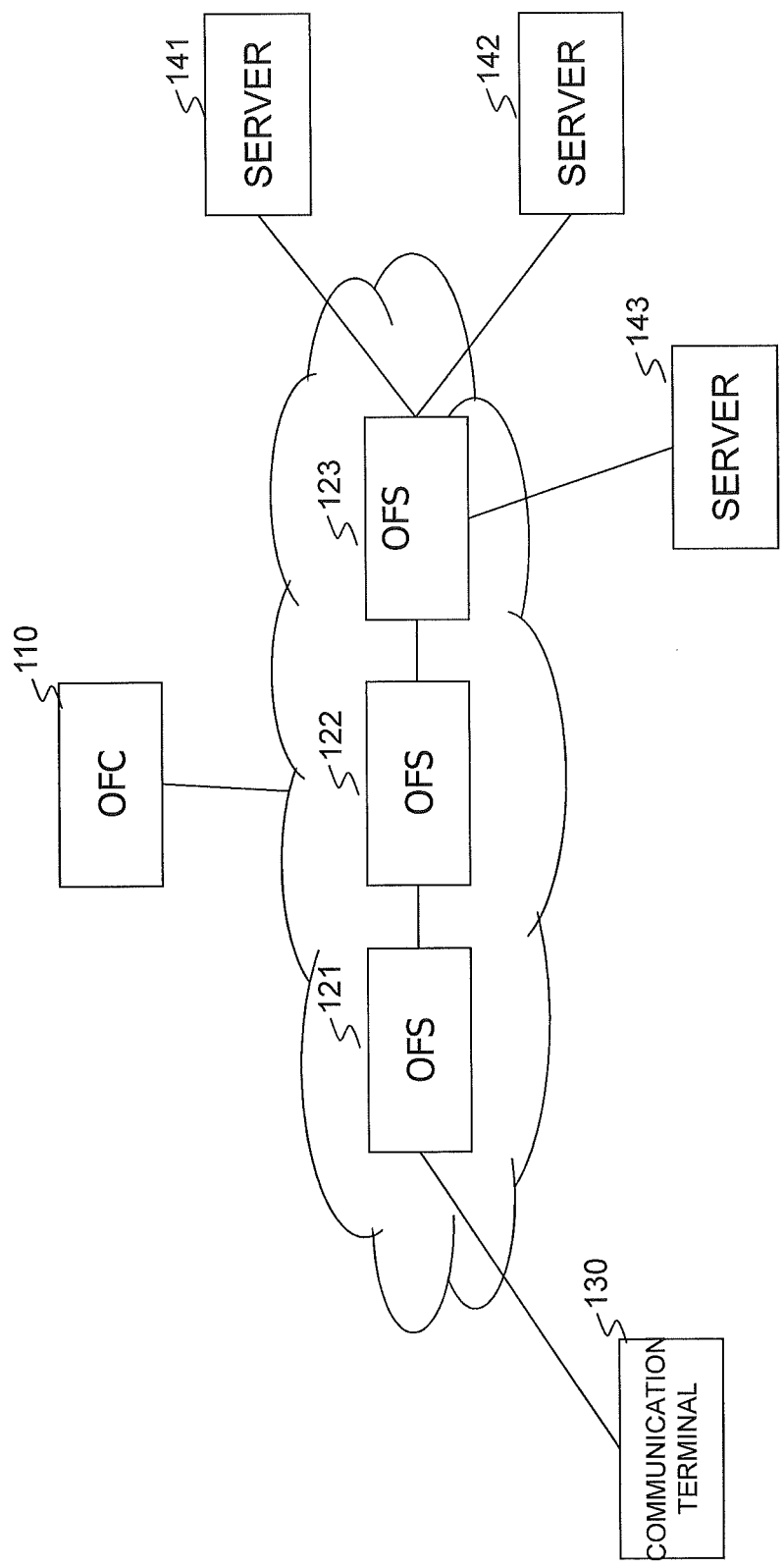
FIG. 7 is a diagram for explaining a configuration example of a communication system.
Figure 8:
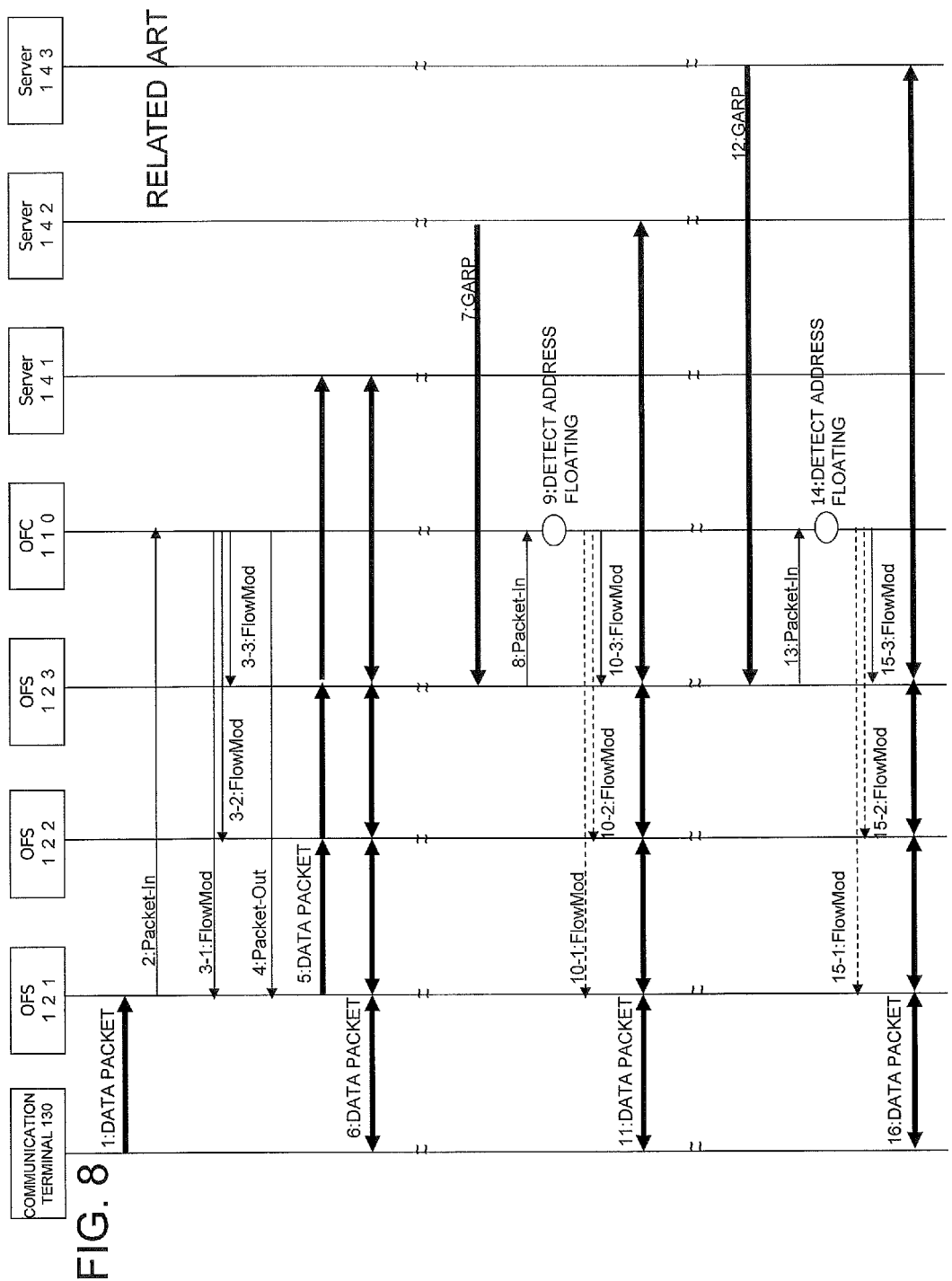
FIG. 8 is a sequence diagram for explaining an operation example of path control.

FIG. 3B is an information table illustrating a correspondence relationship between an IP address for floating and a MAC address of an interface (IF) that currently uses the IP address. In this exemplary embodiment, an address for floating is assumed to be an IP address. Thus, the information table (correspondence table between each IP address and the MAC address) corresponding to FIG. 7 is included. When the address for floating is a MAC address, however, the information table in FIG. 3B is not necessary.

The port group management unit 18A determines whether or not the address floating has actually occurred, using the information tables (two types of the tables illustrated in FIG. 3A and FIG. 3B) stored in the port group database (DB) 18B.

When no packet forwarding rule is needed to be held by the path control function 10 in FIG. 1, the packet forwarding rule DB 17B can be omitted. It may be so configured that the packet forwarding rule DB 17B is separately provided at an external server (not illustrated).

The path control function 10 can also be implemented by adding the port group management unit 18A, on the basis of an OFC disclosed in Non Patent Literature 1, for example. That is, by implementing the path control function 10 in an OFC 110 in FIG. 7, the present invention can be carried out.

When each of the packet forwarding functions 21, 22, and 23 receives the packet, each of the packet forwarding functions 21, 22, and 23 searches a packet forwarding rule table (not illustrated) for the packet forwarding rule having a matching key (matching information) that matches the received packet, and executes processing defined by an action associated with the packet forwarding rule (such as forwarding of the packet to a specific port, flooding (forwarding of the packet to all connected nodes (ports)), discarding of the packet, or the like). The packet forwarding functions 21, 22, and 23 may be respectively implemented in a plurality of node apparatuses each configured to forward the received packet according to the packet forwarding rule. Naturally, the packet forwarding functions 21, 22, and 23 may be respectively implemented in OFSs 121, 122, and 123 in FIG. 7, for example. In this case, the packet forwarding rule table can be associated with the flow table of the OFS described before.

Figure 4:
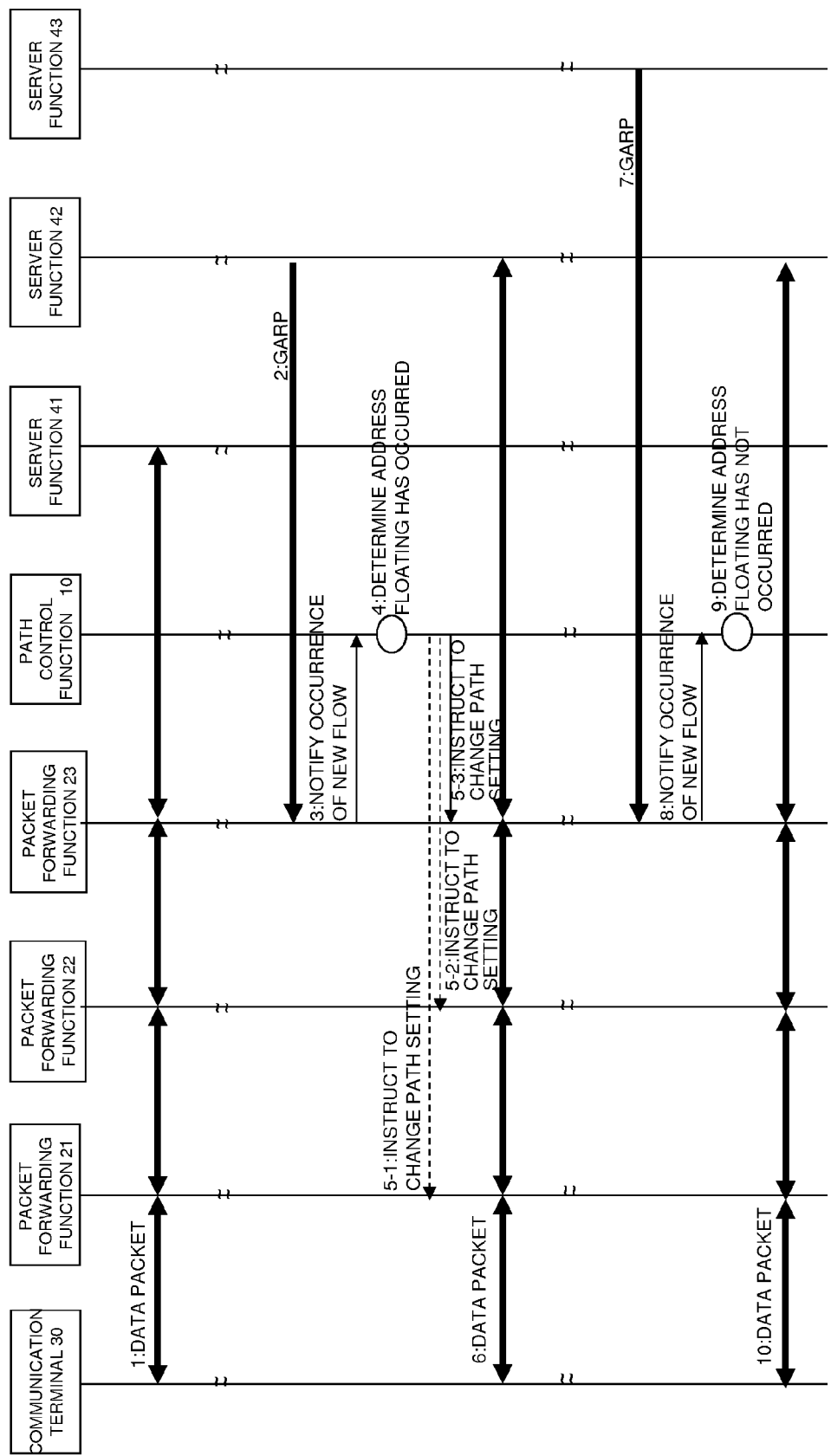
FIG. 4 is a sequence diagram for explaining an operation example of path control in the first exemplary embodiment.

The following describes the overall operation of the present exemplary embodiment with reference to FIG. 4. First, a description will be directed to path control processing when Active/Standby state switching processing is performed between the server function 41 and the server function 42 in FIG. 1. Then, a description will be directed to processing when intervention of the server function 43 has occurred. Referring to FIG. 4, a state where communication between the communication terminal 30 and the server function 41 is established is set to an initial state. In the following description, a number in brackets appended to the end of a sentence that explains each processing corresponds to a number of a representative sequence schematically illustrated in FIG. 4.

<Path Control at Time of Server Switching>

First, the description will be given about path control processing when the Active/Standby state switching processing is performed between the server function 41 and the server function 42.

When the Active/Standby state switching processing is performed between the server function 41 and the server function 42, or when the server function 42 in a Standby state transitions to an Active state, IP address floating occurs. Thus, the server function 42 broadcasts a GARP packet associated with a floating IP address (2) to notify a change of the MAC address associated with the floating IP to the communication system. The packet forwarding function 23 transmits a notification of occurrence of a new flow to the path control function 10 (3). When the port group management unit 18A of the path control function 10 receives the GARP through the notification of occurrence of the new flow, the port group management unit 18A executes processing of determining whether floating of an IP address associated with the GARP has been performed.

<Determination of Address Floating>

Figure 5:
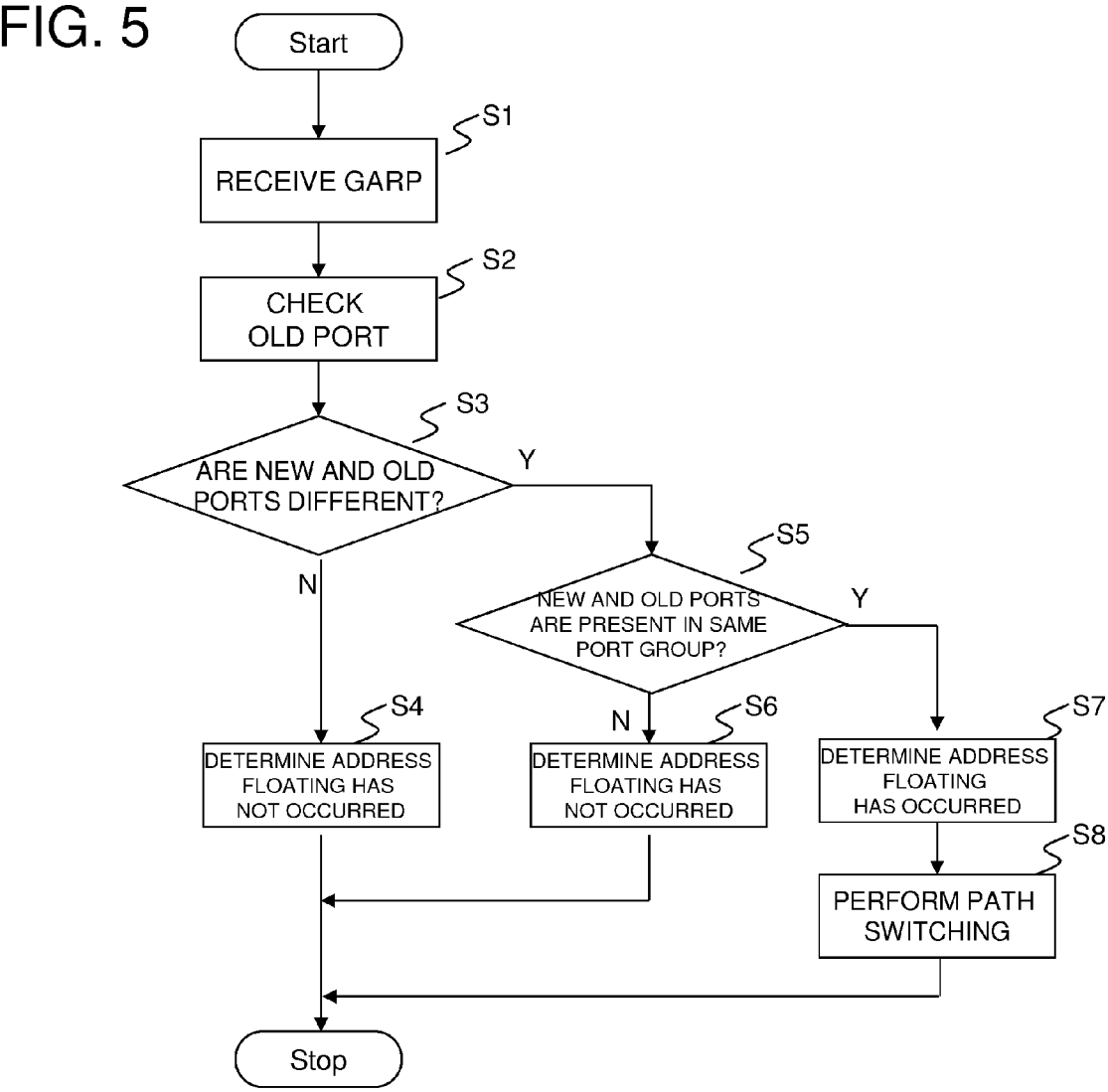
FIG. 5 is a flowchart diagram for explaining an example of an operation procedure of the path control function in the first exemplary embodiment when address floating occurs.
Figure 6:
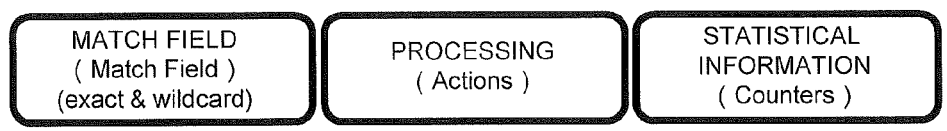
FIG. 6 is a diagram illustrating an example of information (flow entry) held by a flow table of an OpenFlow switch.

A description will be directed to the processing of determining by the path control function 10 whether or not IP address floating has been performed, with reference to FIG. 5.

When the port group management unit 18A of the path control function 10 receives the GARP through the notification of occurrence of a new flow (in step S1), the port group management unit 18A checks a port of the packet forwarding function (referred to as an "old port") to which an interface that had so far used the IP address (IP addresses of a transmission source and a destination (destination of a MAC address inquiry) set to a same value in the GARP packet) associated with the GARP packet was connected (in step S2). A method of checking an old port by the path control function 10 is as follows.

The port group management unit 18A in FIG. 2 identifies a MAC address of an interface that had so far used an IP address associated with the GARP packet, using the tables in FIGS. 3A and 3B.

The port group management unit 18A identifies an old port by combination of the tables in FIGS. 3A and 3B with the information held by the communication terminal location management unit 16. The old port in this exemplary embodiment is a number 1 port of the packet forwarding function 23.

Next, the port group management unit 18A of the path control function 10 compares the old port and the number for the port (referred to as a "new port") of the packet forwarding function that has received the GARP packet this time (in step S3 in FIG. 5). Information on the new port may be included in the notification of occurrence of the new flow, for example.

When the new port and the old port are determined to be the same as a result of the comparison between the new and old ports (branching to NO in step S3 in FIG. 5), the port group management unit 18A of the path control function 10 determines that the address floating has not occurred (in step S4 in FIG. 5).

When the new port and the old port are determined not to be the same as a result of the comparison between the new and old ports (branching to YES in step S3 in FIG. 5), the port group management unit 18A of the path control function 10 refers to the tables in FIGS. 3A and 3B held by the port group management unit 18A to determine whether or not the new and old ports belong to (are present in) a same (common) port group.

When the new port and the old port are determined not to belong to the same port group (branching to NO in step S5 in FIG. 5), the port group management unit 18A of the path control function 10 determines that address duplication rather than address floating has occurred due to a setting error or the like, for example (in step S6 in FIG. 5).

When the new port and the old port are determined to belong to (be present in) the same port group (branching to YES in step S5 in FIG. 5), the port group management unit 18A of the path control function 10 determines that address floating has occurred (in step S7 in FIG. 5). The path control function 10 executes path switching processing for changing the termination point of the path defined in the packet forwarding rule associated with the IP address subjected to the address floating, from the server function 41 to the server function 42, using the information managed by the packet forwarding rule management unit 17A (in step S8 in FIG. 5).

In Active/Standby state switching between the server function 41 and the server function 42, the new and old ports belong to the same port group. Thus, an instruction to change path setting is transmitted to each of the packet forwarding functions 21, 22, and 23 from the path control function 10 (5-1, 5-2, and 5-3 in FIG. 4). Path switching is thereby performed.

<Determination of Address Floating when Intervention of Another Server has Occurred>

The following describes the processing when intervention of the server function 43 has occurred.

When the server function 43 is connected to the communication system, the server function 43 broadcasts a GARP packet (where an IP address of a destination of a MAC address inquiry and an IP address of a transmission source are set to be the same) associated with an IP address set in the server function 43 itself to the communication system in order to perform communication using the IP address (7 in FIG. 4). This IP address is the same as a floating IP used by the server function 42. For this reason, when the path control function 10 receives the GARP packet by a notification of occurrence of a new flow (8 in FIG. 4), the path control function 10 makes determination illustrated in the flow diagram in FIG. 5. It is found from the notification of occurrence of the new flow (8 in FIG. 4) that the packet forwarding function 23 receives the GARP packet from the server function 43, using a new port of port number 3 (refer to FIG. 1). The new port (of port number 3) is different from the old port of port number 2 that has so far been used for forwarding a packet including an IP address that is the same as the destination and transmission source IP addresses of the GARP packet broadcast from the server function 42 (in sequence 2 in FIG. 4). Accordingly, the new and old ports do not belong to the same port group (branching to NO in step S5). Thus, the port group management unit 18A of the path control function 10 determines that address floating has not occurred (9 in FIG. 4 and in step S6 in FIG. 5). The path control function 10 therefore does not perform path switching processing. The communication terminal 30 performs data communication with the server function 42 (10). That is, erroneous determination of the address floating to be caused by intervention of the server function 43 and path switching to be caused by the erroneous determination are avoided. Data communication is performed through a path (using the packet forwarding functions 21 to 22 and port number 2 of the packet forwarding function 23) that has been set between the communication terminal 30 and the server function 42.

In this exemplary embodiment, one or more sets of packet forwarding functions and port numbers are used as information that constitutes each port group to be managed by the path control function 10. A configuration may be employed which adds a Virtual Local Area Network (VLAN) to each set of the packet forwarding function and the port number. VALN may be a port-based VLAN, for example, in which grouping is performed for each port of a layer 2 switch and an ID (identification information) is given to each port. In this case, the field for each port group ID in FIG. 3A may be used for each VLAN-ID.

In this exemplary embodiment, the description has been given about the example where an IP address is used as a floating address. A MAC address, however, may be used.

In this exemplary embodiment, the information that constitutes each port group to be managed by the path control function 10 may be statically managed (e.g., after the information has been set at a certain point of time, the setting is fixedly held). Alternatively, the information that constitutes the port group managed by the path control function 10 may be dynamically updated. Though no particular limitation is imposed, as an event that becomes a trigger for dynamically updating the information that constitutes the port group managed by the path control function 10, addition or removal of each node, addition of an interface, addition or removal of each interface when a fault has occurred in the interface, may be used, as listed below:

connection or disconnection of a new node; or start/stop of a virtual machine (Virtual Machine: VM) when the virtual machine is implemented in each server.

A virtual machine (VM) is implemented by virtualization of a server that includes a virtualization layer (such as a hypervisor) between a server hardware and an OS (Operating System). It may be so arranged, for example, that a network is virtualized, and the above-mentioned packet forwarding function or the like is implemented on virtual machine (VM) and is connected to a virtualized network. Alternatively, the invention can also be applied to a thin client system in which a virtual machine runs an application or the like of a client such as a communication terminal and the client such as the communication terminal obtains a processing result.

An arbitrary terminal may be used as the communication terminal 30 so long as it is a terminal (such as a portable information terminal, a PC (Personal Computer) or the like) that can be directly or indirectly connected to a server through OFSs.

Though the above description has been directed to each exemplary embodiment of the present invention, the present invention is not limited to the exemplary embodiments described above. Further modification, substitution, and adjustment can be added.

Each disclosure of the above-listed Patent Literature and the above-listed Non Patent Literatures is incorporated herein by reference. Modification and adjustment of each exemplary embodiment are possible within the scope of the overall disclosure (including the claims) of the present invention and based on the basic technical concept of the present invention. Various combinations and selections of various disclosed elements are possible within the scope of the claims of the present invention. That is, the present invention naturally includes various variations and modifications that could be made by those skilled in the art according to the overall disclosure including the claims and the technical concept.

What is claimed is:

1. A communication system comprising:
   a control apparatus configured to generate a processing rule that defines packet processing in a communication apparatus and set the generated processing rule in the communication apparatus; and
   the communication apparatus configured to process a received packet according to the processing rule set by the control apparatus, wherein
   the control apparatus includes:
   a storage unit configured to store information on a connection IF (interface) group including information on one or more connection IFs of the communication apparatus capable of supporting address floating; and
   a management unit configured to receive a notification from the communication apparatus, when a packet in accordance with a predetermined preset protocol is received by the communication apparatus through a second connection IF different from a first connection IF so far used for forwarding a packet having a same address as an address associated with the packet in accordance with the predetermined preset protocol, and check with reference to the storage unit whether or not the first connection IF and the second connection IF of the communication apparatus belong to a common connection IF group that supports address floating to determine presence or absence of the address floating.

2. The communication system according to claim 1, wherein the connection IF group that supports floating of the address includes a port group which includes information on one or more ports of the communication apparatus and supports the address floating, or a set of the port group and VLAN (Virtual Local Area Network) information.

3. The communication system according to claim 2, wherein
   when the packet in accordance with the predetermined preset protocol is received by the communication apparatus through a second port constituting the second connection IF different from a first port constituting the first connection IF that has been so far used for forwarding the packet having the same address as the address associated with the packet in accordance with the predetermined preset protocol, the management unit of the control apparatus receives the notification from the communication apparatus, and check, with reference to the storage unit, whether or not the first port and the second port of the communication apparatus belong to a common port group that supports address floating;
   when the first and second ports of the communication apparatus are determined to belong to the common port group, the management unit of the control apparatus determines that the address floating has occurred;
   when the first and second port of the communication apparatus are determined not to belong to the common port group, the management unit of the control apparatus determines that the address floating has not occurred; and
   when the management unit of the control apparatus determines that the address floating has occurred, the control apparatus sets the processing rule for switching the connection IF of the communication apparatus from the first port associated with the first connection IF to the second port associated with the second connection IF refers in the communication apparatus.

4. The communication system according to claim 1, wherein the address comprises an IP (Internet Protocol) address or a MAC (Media Access Control) address.

5. The communication system according to claim 1, wherein the control apparatus variably sets information on the connection IF group to be stored in the storage unit.

6. The communication system according to claim 1, wherein the packet in accordance with the predetermined preset protocol comprises a packet transmitted for detecting address duplication using an address resolution protocol (ARP: Address Resolution Protocol) packet, a neighbor advertisement (Neighbor Advertisement) packet, or a packet equivalent to the packet transmitted for detecting address duplication or the neighbor advertisement packet.

7. A control apparatus comprising:
   a first unit configured to generate a processing rule that defines packet processing and set the generated processing rule in a communication apparatus configured to process a received packet according to the processing rule;
   a storage unit configured to store information on a connection IF (interface) group including information on one or more connection IFs of the communication apparatus capable of supporting address floating; and
   a second unit configured to receive a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol, and check, with reference with the storage unit, whether or not the first connection IF and the second connection IF of the communication apparatus belong to a common connection IF group that supports address floating to determine presence or absence of the address floating.

8. The control apparatus according to claim 7, wherein
   the connection IF group that supports floating of the address includes a port group which includes information on one or more ports of the communication apparatus and supports the address floating;
   when the packet in accordance with the predetermined preset protocol is received by the communication apparatus through a second port constituting the second connection IF different from a first port constituting the first connection IF that has been so far used for forwarding the packet having the same address as the address associated with the packet in accordance with the predetermined preset protocol, the second unit receives the notification from the communication apparatus, and checks, with reference to the storage unit, whether or not the first port and the second port of the communication apparatus belong to a common port group that supports address floating;

when the first and second ports of the communication apparatus are determined to belong to the common port group, the second unit determines that the address floating has occurred;

when the first and second port of the communication apparatus are determined not to belong to the common port group, the second unit determines that the address floating has not occurred; and when the second unit determines that the address floating has occurred, the first unit sets, in the communication apparatus, the processing rule for switching the connection IF of the communication apparatus from the first port to the second port.

9. A communication method by a control apparatus configured to generate a processing rule that defines packet processing in a communication apparatus and set the generated processing rule in the communication apparatus, the communication method comprising:

storing in a storage unit information on a connection IF (interface) group including information on one or more connection IFs of the communication apparatus capable of supporting address floating;

receiving a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol; and checking, with reference to the storage unit, whether or not the first connection IF and the second connection IF of the communication apparatus belong to a common connection IF group that supports address floating to determine presence or absence of the address floating.

10. A non-transitory computer readable recording medium storing therein a program for a computer constituting a control apparatus configured to generate a processing rule that defines packet processing in a communication apparatus and set the generated processing rule in the communication apparatus, the program causing the computer to execute processing including:

managing a storage unit configured to store information on a connection IF (interface) group including information on one or more connection IFs of the communication apparatus capable of supporting address floating;

receiving a notification from the communication apparatus when a packet in accordance with a predetermined preset protocol is received at the communication apparatus through a second connection IF different from a first connection IF that has been so far used for forwarding a packet having a same address as an address associated with the packet in accordance with the predetermined preset protocol; and checking, with reference to the storage unit, whether or not the first connection IF and the second connection IF of the communication apparatus belong to a common connection IF group that supports address floating to determine presence or absence of the address floating.

11. The control apparatus according to claim 7, wherein the address comprises an IP (Internet Protocol) address or a MAC (Media Access Control) address.

12. The control apparatus according to claim 7, wherein the control apparatus variably sets information on the connection IF group to be stored in the storage unit.

13. The control apparatus according to claim 7, wherein the packet in accordance with the predetermined preset protocol comprises a packet transmitted for detecting address duplication using an address resolution protocol (ARP: Address Resolution Protocol) packet, a neighbor advertisement (Neighbor Advertisement) packet, or a packet equivalent to the packet transmitted for detecting address duplication or the neighbor advertisement packet.

14. The communication method according to claim 9, wherein
the connection IF group that supports floating of the address includes a port group which includes information on one or more ports of the communication apparatus and supports the address floating, the method comprising:

when the packet in accordance with the predetermined preset protocol is received by the communication apparatus through a second port constituting the second connection IF different from a first port constituting the first connection IF that has been so far used for forwarding the packet having the same address as the address associated with the packet in accordance with the predetermined preset protocol, receiving the notification from the communication apparatus, and checking, with reference to the storage unit, whether or not the first port and the second port of the communication apparatus belong to a common port group that supports address floating;

determining that the address floating has occurred, when the first and second ports of the communication apparatus are determined to belong to the common port group, while determining that the address floating has not occurred, when the first and second port of the communication apparatus are determined not to belong to the common port group; and setting, in the communication apparatus, the processing rule for switching the connection IF of the communication apparatus from the first port to the second port, when it is determined that the address floating has occurred.

15. The communication method according to claim 9, wherein the address comprises an IP (Internet Protocol) address or a MAC (Media Access Control) address.

16. The communication method according to claim 9, comprising:
variably setting information on the connection IF group to be stored in the storage unit.

17. The communication method according to claim 9, wherein the packet in accordance with the predetermined preset protocol comprises a packet transmitted for detecting address duplication using an address resolution protocol (ARP: Address Resolution Protocol) packet, a neighbor advertisement (Neighbor Advertisement) packet, or a packet equivalent to the packet transmitted for detecting address duplication or the neighbor advertisement packet.

18. The recording medium according to claim 10, wherein
the connection IF group that supports floating of the address includes a port group which includes information on one or more ports of the communication apparatus and supports the address floating, the recording medium storing the program causing the computer to execute processing including:

when the packet in accordance with the predetermined preset protocol is received by the communication apparatus through a second port constituting the second connection IF different from a first port constituting the first connection IF that has been so far used for forwarding the packet having the same address as the address associated with the packet in accordance with the predetermined preset protocol, receiving the notification from the communication apparatus, and checking, with reference to the storage unit, whether or not the first port and the second port of the communication apparatus belong to a common port group that supports address floating;

determining that the address floating has occurred, when the first and second ports of the communication apparatus are determined to belong to the common port group, while determining that the address floating has not occurred, when the first and second port of the communication apparatus are determined not to belong to the common port group; and setting, in the communication apparatus, the processing rule for switching the connection IF of the communication apparatus from the first port to the second port, when it is determined that the address floating has occurred.

19. The recording medium according to claim 10, storing the program causing the computer to execute processing including:

variably setting information on the connection IF group to be stored in the storage unit.

20. The recording medium according to claim 10, wherein the address comprises an IP (Internet Protocol) address or a MAC (Media Access Control) address, and the packet in accordance with the predetermined preset protocol comprises a packet transmitted for detecting address duplication using an address resolution protocol (ARP: Address Resolution Protocol) packet, a neighbor advertisement (Neighbor Advertisement) packet, or a packet equivalent to the packet transmitted for detecting address duplication or the neighbor advertisement packet.

* * * * *